May 27, 1930. W. H. MOUNT 1,759,912
ANTIAIRCRAFT OFFENSIVE AND DEFENSIVE MEANS
Filed Nov. 11, 1925 2 Sheets-Sheet 2
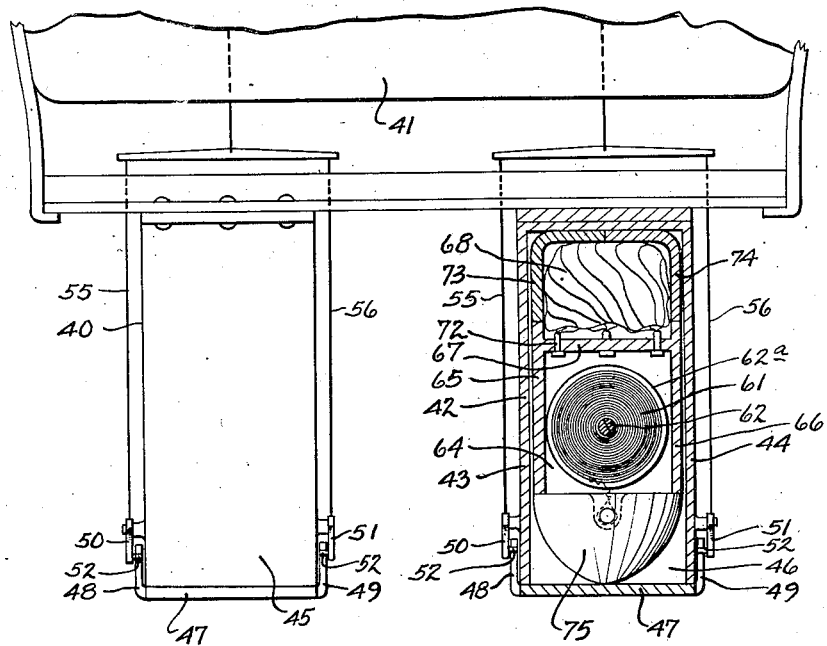
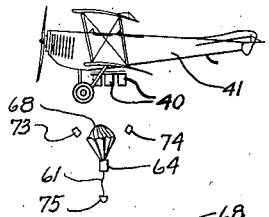
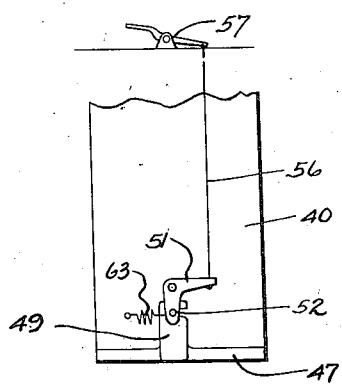

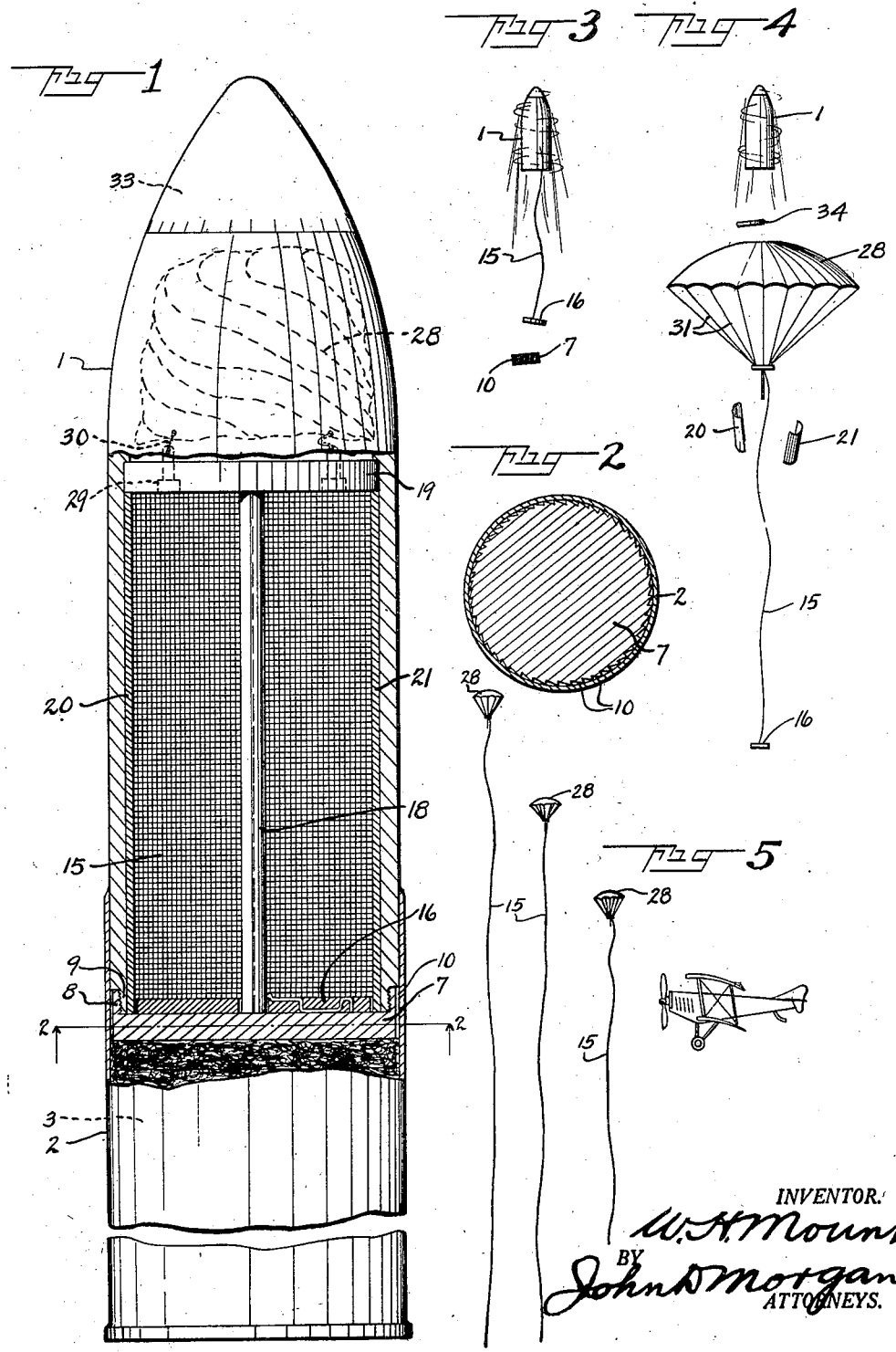

Patented May 27, 1930

1,759,912

UNITED STATES PATENT OFFICE

WILLIAM H. MOUNT, OF SUMMIT, NEW JERSEY

ANTIAIRCRAFT OFFENSIVE AND DEFENSIVE MEANS

Application filed November 11, 1925. Serial No. 68,273.

The invention relates to novel and useful devices for use in aerial warfare, and more particularly to devices for defending against, and destroying, hostile aircraft.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is an elevation, with parts in section and parts broken away, of a projectile embodying the invention;

Fig. 2 is a transverse section, on line 2—2 of Fig. 1;

Fig. 3 is a view, largely diagrammatic, showing the first stages of the ejection from the projectile of the air-plane entangling device;

Fig. 4 is a like view, showing the entangling device entirely disengaged from the projectile, and in position to engage with and entangle an air-plane;

Fig. 5 is a similar diagrammatic view showing a plurality of the devices floating in the air in position to entangle an advancing plane;

Fig. 6 is a fragmentary elevation, with parts in section, showing my invention adapted to be carried by, and released from, an air-plane;

Fig. 7 is a fragmentary elevation, looking at the lower right-hand part of Fig. 6 from the right; and Fig. 8 is a diagrammatic view, showing one air-plane releasing the entangling devices into the path of another plane.

The invention is directed to producing a novel and effective device for destroying hostile air-planes, the device constituting means for attack upon a plane, or fleet of planes, and also constituting defensive devices for excluding hostile planes from flying over a city, fort, ship, fleet, or other area or thing to be protected.

In the present embodied form of my device, a very long entangling wire or plurality of wires, preferably vertically disposed, or more or less so, is practically suspended in the air, and arranged to sink very slowly, the device being placed in the path of the hostile air-plane or planes, so as to become entangled with the propeller or the wings, and adapted thereby to disable and probably to destroy the airplane. The devices of my invention have the advantage that they are practically invisible to the pilot of an oncoming plane. A single device may be of very great length and is therefore effective through relatively great altitude, and the devices can be placed in the air as close together as need be, and may be launched or placed as desired either from the surface of the earth by gun fire, or from an air-plane, in the latter case being dropped by an operator in the plane.

The preferred embodiment comprises a reeled entangling wire of great length and high tensile strength, adapted to be unreeled at a great height, and to extend downwardly through a great distance, the upper end of the wire being attached to a parachute, which unfolds to maintain the downwardly extending entangling wire flotant in the air for a very long time. Thus every shot from an anti-aircraft gun may be given a protective efficiency over a long period of time, and a likewise protracted destructive potentiality independently of the requirement of making a hit or aiming within destructive distance of an air-plane.

Furthermore, a pursued plane has both a defensive and destructive agency independent of its gun or guns, and at a time when its gun is not available for action against the pursuer.

Also, either by gun fire or the operation from air-planes, a defensive cordon of the entangling wires of any desired height could be maintained entirely about a city, fort, fleet, or any area to be protected for an indefinite time, and could also constitute a defense for the guns or planes creating the cordon, whereby they could protect themselves also and thus maintain the defensive area indefinitely.

A battery of anti-aircraft guns could fire a great number of these at relatively great distances in front of a plane with a vastly increased chance of destroying the plane as compared with direct hits. This form of attack could obviously be employed in cooperation with other guns endeavoring to make direct hits with the usual explosive projectiles.

In the form of my invention wherein the defensive and destroying devices are projected by gun fire, usually from the ground, the device is contained within a projectile, the projectile being provided with means for launching or releasing the device at the desired elevation, the device thereafter remaining flotant in the air for a relatively long period of time. By this means, anti-aircraft artillery upon the ground is freed from the necessity of hitting or aiming close to a fast-moving hostile plane, and each shot fired possesses the potentiality of destroying a hostile air-plane, and possesses this potentiality not merely at the time of firing but for a protracted period thereafter.

My invention in its broader features comprises means for setting afloat in the atmosphere a very long wire or plurality of wires, which extends downwardly, and is or are kept afloat in the atmosphere for a protracted period by a parachute. In the use of my invention, a large number of these, in as close lateral proximity to each other as may be desired, are employed, and they may be likewise employed in one tier above another, thereby creating in the atmosphere an air-plane entangling and destroying series of instrumentalities of practically any height and any lateral extent that may be necessary or desired in the particular operation.

In the embodied form of the application for use in anti-aircraft artillery, a shell or projectile 1 is provided of suitable size and design for such use, in accordance with the best known practice. The projectile will be fired from the gun by the ordinary or proper projecting charge, and in the usual or suitable manner. The projectile is provided with a shell 2, which may be of usual construction, and includes the usual firing charge 3.

The entangling wire or wires are enclosed within the projectile, and means are provided for causing the unreeling of the wire during the subsequent flight of the projectile, the shell 2 remaining in the gun in the usual manner. The particular means for doing this may be widely varied as desired. In the embodied form, a retaining disc 7 is provided with an annular flange 8, which has an internal screw-thread, which is screwed onto a corresponding thread upon a flange 9 formed on the rear circular edge of the projectile 1. The retaining disc 7 is preferably detached by the air action due to the flight and rotation of the shell, although inertia means, or other suitable devices for effecting this might be employed, so far as concerns the main features of the invention. As embodied (Figs. 1 and 2), the retaining disk 7, including the annular flange 8, is provided with external, peripherally-located vanes 10, shaped and positioned so that their rotational thrust will unscrew the disc 7 and flange 8 from the projectile.

In the present preferred form of arranging the entangling wire 15, it has a weight 16 attached to the external end thereof, that is, nearest the butt of the projectile, the wire 15 being attached to the weight 16, the weight 16 fitting loosely within the projectile and resting upon the retaining disc 7, so that when the disc 7 is unscrewed by the air action, the disc 16 will drop out by gravity or inertia. The wire 15, which will be of the greatest tensile strength, and of relatively very great length, is wound in disc form about a spindle 18, located longitudinally and centrally within the projectile 1, so that when the disc 16 falls, the wire will unwind freely and certainly from the rear of the traveling projectile. The spindle 18 at its upper end is fixed to a disc 19, fitted tightly but detachably within the forward part of the projectile, the upper or inner end of the wire 15 being firmly fixed to the disc. The disc 19 and spindle 18 are freed from the projectile when the wire 15 is entirely unreeled, as will be later described.

It will be understood that the strength and fastening of the parts must be sufficiently strong to resist the sharp strains to which it is subjected. The coil of wire 15, wound about the projectile 18, as already described, is encased within two hemi-cylindrical casing members 20 and 21, fitting snugly between the discs 7 and 19 and within the cylindrical cavity of the projectile 1, but being separate and detached from all these, so that when the wire 15 is entirely unwound, and the entangling device is free from the projectile, the two hemi-cylindrical members 20 and 21 will fall freely away.

The means for maintaining the entangling wire or wires 15 flotant in the atmosphere for the longest possible period comprises a parachute 28, which is stowed within the forward part of the projectile, in suitable manner, which may be similar in its general structure and operation to such devices as used in the pyrotechnic art, in so far as same is applicable to the present invention. The parachute is securely connected to the disc 19 by suitable means, such as the headed and countersunk pins or screw bolts 29, the upper and inner ends of which are connected by links 30 to the cords or stays 31 of the parachute 28.

In accordance with certain features of the invention, the device may be arranged to displace itself from the interior of the traveling shell 1 by atmospheric action, gravity or inertia, but if desired a displacing or launching explosive charge 33 may be placed in the nose of the projectile, and may be fired in proper time relation and by any suitable means to gently eject the parachute and the disc 19 from the interior of the projectile. In such case a disc 34 is provided in the head of the projectile between the parachute and the ejecting charge 33. It will be understood that the timing of the ejection of the parachute from the projectile can be utilized to determine the height at which the entangling device is set afloat.

It will be understood that the details of the invention in the foregoing application or adaptation thereof may be very widely varied within the skill and experience of the designers and users of air-craft artillery, air-craft ordnance and practice, the main purpose of the invention being to fire by means of a projectile to a great altitude a mechanism or device which will unreel or otherwise dispose in the atmosphere a relatively long and strong entangling wire with means for maintaining it flotant for a protracted period, the wire being capable of engaging with the propeller of an air-plane to destroy it, or with the wings thereof to entangle and destroy the same. It will be clear that explosive charges may be attached to the wire if desired, capable of detonation upon contacting with a plane, although it will be usually found efficient to rely upon the entangling power of the device.

Referring now to the form of my invention wherein it is launched from an air-plane (as distinguished from being fired by a projectile from the earth), as embodied a plurality of the devices 40 are arranged in a plurality of series beneath the body 41 of an air-plane, the latter being shown only conventionally in the drawings. In this form of the invention, a plurality of casings 42, which may be preferably or conveniently of rectangular form are attached to the bottom, or other convenient part of an air-plane, these casings having preferably side walls 43 and 44, and front and rear walls 45 and 46. The bottom of these casings are open, and are provided with a releasable closure 47, which is released at the will of an operator in the air-plane.

In the embodied form of releasing means, the closure 47 is provided with two upwardly-projecting, hooked lugs 48 and 49. Pivotally supported on the bottom part of the respective side walls 43 and 44 of the casings 42 are angle levers 50 and 51, respectively, having pins 52 adapted to pass into the hooks 48 and 49, to hold the closure in place, the levers 50 and 51 being resiliently held in holding positions by respective springs 63. From the other ends of the levers 50 and 51 rods 55 and 56 extend upwardly, and are connected to be actuated together, by any suitable means 57, by the operator in the air-plane.

Referring now to the detailed construction of the entangling device contained within the holder 40, and adapted to be released therefrom at the will of the operator, an entangling wire (or wires) 61 is reeled upon a reel, comprising a shaft 62 and end flanges 62ª at either end thereof. The reel is journaled in the side walls 64, respectively, of a reel holder contained loosely within the holder 40 and having also front and back walls 65 and 66. The reel holder has an integral top plate 67, and the parachute 68 is located thereabove and is attached thereto by suitable means. As shown, pins or screws 72 are fixed in the top plate 67 and the cords or stays of the parachute 68 are fixed thereto. The wire in this device could be reeled the same as in the projectile.

The parachute is enclosed within a two-part closure 73 and 74, having four sides and a top to fit within the upper part of the holder 40, the bottom thereof being open, and the bottom edges resting upon the top edges of the corresponding part of the reel holder 64. The outer end of the entangling wire 61 is preferably attached to a weight 75, which may be of suitable shape and mass to meet the proper requirements of extending the wire without placing a breaking strain thereon, due to the velocity of the weight when the wire becomes completely unwound.

When the operator in the air-plane desires to release one of the entangling devices, he will operate the releasing members 57, and the closure 47 will be released and dropped. The reel holder 64 will then drop out of the casing 42, which latter is fast to the bottom of the air-plane. The weight 75 will likewise be free and unsupported and will begin to drop unreeling the wire 61 from the reel. As the reel holder 64 drops from the casing 42, the casing members 73 and 74 about the parachute will also drop out of the holder 40, but being loose will fall apart and will leave the parachutes free to open, and to maintain the reel holder 64 flotant in the air. The weight 75 must be designed, and the parts must all be of sufficient strength so that the velocity acquired by the weight by the time the entangling wire is completely unwound will not be sufficient to snap or break any part of the mechanism.

It will be understood likewise that with this application of the invention, the details of the mechanism may be widely varied as to size and design as may be found expedient and desirable from experience, the main purpose and object being to release from an air-plane, at such time and place in the atmosphere as may be desired a plurality of airplane entangling devices of relatively very great length and which will remain in the atmosphere for a relatively long time, with a potentiality in each of entangling and wrecking an air-plane, and at the same time being invisible to the pilot of a flying plane. By way of example, if it were desired to protect a city, a fort, or fleet, or other objective from the attack of hostile air-planes, a plurality of protecting air-planes could fly about the areas or objective to be protected continuounsly dropping the entangling devices from different altitudes, which would constitute a flotant protective wall about the objective.

From all the foregoing it will be understood that a mechanism has been provided constituting an exemplary embodiment of the invention, and realizing the objects and advantages herein set forth, together with other objects and advantages. It will be understood further that departures may be made from the exact mechanism as shown and described, within the scope of the accompanying claims, without departing from the principles of the invention and without sacrificing its chief advantages.

What I claim is:—

1. A device for offense and defense against aircraft including in combination a projectile having a wire and an attached parachute stowed therewithin, means for releasing the wire during the flight of the projectile to trail from the projectile, and means for thereafter releasing the parachute from the projectile to support the downwardly dependent wire in the air.

2. A device for offense and defense against aircraft including in combination a projectile having a wire and an attached parachute stowed therewithin, means operated by movement of the projectile for releasing the wire to trail from the projectile, and means for thereafter releasing the parachute from the projectile to support the downwardly dependent wire in the air.

3. A device for offense and defense against aircraft comprising a projectile, a wire coiled therewithin and a parachute attached to the wire, means for releasing the wire from the projectile to uncoil and trail from the projectile and means operable at a predetermined time thereafter to release the parachute from the the projectile to support the wire in the air.

4. A device for offense and defense against aircraft comprising a projectile, a wire coiled therewithin and a parachute attached to the wire, means operated by rotation of the projectile for releasing the wire from the projectile to uncoil and trail from the projectile, and means operable at a predetermined time thereafter to expel the parachute from the projectile to support the wire in the air.

5. A device for offense and defense against aircraft including in combination, a projectile, a wire coiled therewithin and a parachute attached to the wire, means for first causing the wire to uncoil and depend downwardly from the projectile and then to release the parachute from the projectile whereby the downwardly extending wire is held flotant in the air by the parachute for a protracted period.

6. A device for offense and defense against aircraft including in combination, a wire coiled therewithin and a parachute attached to one end of the wire, means for causing the wire to uncoil and trail the projectile and means allowing the uncoiling wire to release the parachute from the projectile whereby the downwardly extending wire is held flotant in the air for a protracted period of time.

7. A device for offense and defense against aircraft including in combination, a projectile, a wire coiled within the projectile body, a parachute attached to the wire and releasably held within the projectile, means for uncoiling the wire and causing it to trail the projectile and for releasing the parachute thereafter when the wire is substantially completely uncoiled whereby the trailing wire is held flotant in the air for a protracted period.

8. A device for offense and defense against aircraft including in combination, a projectile, a wire coiled within the projectile body, a parachute attached to the wire and releasably held with the projectile, means for uncoiling the wire from the projectile while it is in motion and means operable a predetermined time thereafter for releasing the parachute from the projectile to hold the wire suspended in the air for an extended period.

9. A device for offense and defense against aircraft, including in combination a projectile, a wire coiled within the projectile body, a parachute attached to the wire and releasably held within the projectile, a weight attached to the wire, means for releasing the weight while the projectile is in motion for uncoiling the wire and causing it to trail the projectile and means for thereafter releasing the parachute from the projectile whereby the wire is held flotant in the air for a protracted period.

In testimony whereof, I have signed my name to this specification.

WILLIAM H. MOUNT.